United States Patent
Glassco et al.

(10) Patent No.: US 10,097,555 B2
(45) Date of Patent: *Oct. 9, 2018

(54) DEVICE-TO-DEVICE NETWORK MEMBERSHIP CONFIRMATION

(71) Applicant: Neone, Inc., Austin, TX (US)

(72) Inventors: Dave Glassco, Austin, TX (US);
Athanassios H. Diacakis, San Francisco, CA (US); Dan Cohen, San Francisco, CA (US)

(73) Assignee: Neone, Inc., Austin, TX (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/060,605

(22) Filed: Mar. 4, 2016

(65) Prior Publication Data

US 2016/0261602 A1 Sep. 8, 2016

Related U.S. Application Data

(60) Provisional application No. 62/177,069, filed on Mar. 4, 2015.

(51) Int. Cl.
*H04L 29/00* (2006.01)
*H04L 29/06* (2006.01)
(Continued)

(52) U.S. Cl.
CPC .......... *H04L 63/102* (2013.01); *H04L 9/0866* (2013.01); *H04L 9/32* (2013.01);
(Continued)

(58) Field of Classification Search
CPC ..... H04W 12/02; H04W 8/005; H04W 4/005; H04W 88/04; H04W 12/06
See application file for complete search history.

(56) References Cited

U.S. PATENT DOCUMENTS

2007/0055877 A1 3/2007 Persson et al.
2007/0094691 A1 4/2007 Gazdzinsky
(Continued)

FOREIGN PATENT DOCUMENTS

WO WO2014/165747 10/2014 ............ H04W 12/04

OTHER PUBLICATIONS

International Search Report, PCT/US 16/20792, dated May 26, 2016.
(Continued)

*Primary Examiner* — Ghazal B Shehni
(74) *Attorney, Agent, or Firm* — Steven Stupp

(57) ABSTRACT

An electronic device in a device-to-device network of a user of the electronic device communicates with a group of one or more other instances of the electronic via dynamic connections that are based on pre-established and maintained (i.e., long-lived) associations in the device-to-device network. Moreover, a given dynamic connection between the electronic device and a given instance of the electronic device in the group is setup by the electronic device without assistance of a computer in another network, which conveys the communication within the group. During operation, the electronic device: confirms that a second instance of the electronic device in the group (which is associated with a second user in the device-to-device network) is associated with a provider of the electronic device; and when the association is confirmed, communicates a message to the second instance of the electronic device at a location specified by one of the associations.

20 Claims, 13 Drawing Sheets

(51) Int. Cl.
  *H04L 29/08* (2006.01)
  *H04L 9/32* (2006.01)
  *H04L 12/06* (2006.01)
  *H04W 12/02* (2009.01)
  *H04L 12/64* (2006.01)
  *H04L 9/08* (2006.01)

(52) U.S. Cl.
  CPC ............ *H04L 9/3271* (2013.01); *H04L 12/06* (2013.01); *H04L 12/6418* (2013.01); *H04L 63/0428* (2013.01); *H04L 63/061* (2013.01); *H04L 63/062* (2013.01); *H04L 63/065* (2013.01); *H04L 63/08* (2013.01); *H04L 63/0876* (2013.01); *H04L 67/1046* (2013.01); *H04L 67/18* (2013.01); *H04W 12/02* (2013.01)

(56) References Cited

U.S. PATENT DOCUMENTS

| | | |
|---|---|---|
| 2009/0249067 A1 | 10/2009 | Lie et al. |
| 2013/0318347 A1 | 11/2013 | Moffat .................... H04L 63/08 |
| 2014/0164517 A1 | 6/2014 | Valdetaro |
| 2014/0189115 A1* | 7/2014 | Eggert .................. H04W 12/06 709/225 |
| 2014/0301552 A1 | 10/2014 | Yi et al. |
| 2016/0065362 A1 | 3/2016 | Choyi .................... H04L 9/083 |

OTHER PUBLICATIONS

U.S. Appl. No. 15/060,610, Non-Final Office Action, dated Oct. 17, 2017.
U.S. Appl. No. 15/060,589, Non-Final Office Action, dated Nov. 1, 2017.
U.S. Appl. No. 15/060,610, Response to Non-Final Office Action, dated Jan. 16, 2018.
U.S. Appl. No. 15/060,589, Response to Non-Final Office Action, dated Jan. 29, 2018.
U.S. Appl. No. 15/060,589, Final Office Action, dated Mar. 16, 2018.
U.S. Appl. No. 15/060,610, Notice of Allowance, dated May 17, 2018.
U.S. Appl. No. 15/060,589, Response to Final Office Action, dated Jun. 15, 2018.
U.S. Appl. No. 15/060,589, Notice of Allowance, dated Aug. 2, 2018.
U.S. Appl. No. 15/060,610, Response to Notice of Allowance, dated Aug. 4, 2018.

* cited by examiner

DEVICE-TO-DEVICE NETWORK MEMBERSHIP CONFIRMATION

CROSS-REFERENCE TO RELATED APPLICATION

This application claims priority under 35 U.S.C. § 119(e) to U.S. Provisional Application Ser. No. 62/177,069, entitled "Secure Distributed Device-to-Device Network," by Dave Glassco, Athanassios Diacakis and Dan Cohen, filed on Mar. 4, 2015, the contents of which are herein incorporated by reference.

This application is related to U.S. Non-provisional application Ser. No. 15/060,589, entitled "Secure Distributed Device-to-Device Network," by Dave Glassco, Athanassios Diacakis and Dan Cohen, filed on Mar. 3, 2016; and to U.S. Non-provisional application Ser. No. 15/060,606, entitled "Enrollment in a Device-to-Device Network," by Dave Glassco, Athanassios Diacakis and Dan Cohen, filed on Mar. 4, 2016; and to U.S. Non-provisional application Ser. No. 15/060,610, entitled "Device-to-Device Network Location Updates," by Dave Glassco, Athanassios Diacakis and Dan Cohen, filed on Mar. 4, 2016, the contents of all of which are herein incorporated by reference.

BACKGROUND

Field

The described embodiments relate to techniques for securely communicating content among electronic devices. In particular, the described embodiments relate to techniques for communicating content among electronic devices in a secure, distributed device-to-device network.

Related Art

The Internet is an increasingly popular public network for exchanging information or content among individuals and organizations. In particular, the wide-spread availability of the Internet and increasing bandwidths is allowing individuals to access a wide variety of content via an ever-increasing number of applications. For example, many individuals use so-called 'social networks' to exchange information with large groups of people, including their friends, family and colleagues. These social networks allows users to stay in touch with and to rapidly disseminate information to the groups of people, and allows uses to discover new friends and colleagues based on the information other users publish in the social networks.

However, the same strengths of social networks can also be liabilities. In particular, the same ease of access and the ability to exchange information with a large group of people can make it difficult for users of social network to control access to the information that they publish on the social networks. For example, many social networks leverage the published information to generate revenue, such as by selling the published information to third parties, and by analyzing the published information to provide advertising and promotional offers to the users.

Fundamentally, there is a conflict of interest between individuals' desire for privacy and the desire of providers of social networks to make money. Thus, even though some social networks provide privacy settings that ostensibly allow users to control who sees or accesses their information, in practice the privacy settings typically do not allow the users to restrict or limit how the providers of the social networks use the published information. Or, as it has sometimes been stated, when a service offered by a provider of a social network on the Internet is seemingly 'free,' you are the product, not the customer. The inherent tradeoff between privacy and the convenient service provided by social networks is often concerning and frustrating to users, which can degrade the user experience.

SUMMARY

A group of described embodiments includes an electronic device that includes an interface circuit. This interface circuit communicates with a group of one or more other instances of the electronic device via dynamic connections that are based on pre-established and maintained associations in a device-to-device network of a user of the electronic device, where the associations are maintained for longer time than the dynamic connections. Moreover, a given dynamic connection between the electronic device and a given instance of the electronic device in the group is setup by the electronic device without assistance of a computer in another network, which conveys the communication between the electronic device and the given instance of the electronic device via at least a non-wireless communication technique. Furthermore, the electronic device includes a control mechanism. During operation, the control mechanism: confirms that a second instance of the electronic device in the group is associated with a provider of the electronic device, where the second instance of the electronic device is associated with a second user in the device-to-device network; and when the association is confirmed, communicates, via the interface circuit, a message to the second instance of the electronic device at a location specified by one of the associations.

For example, the electronic device may include an authentication circuit that implements a coding technique that is shared by the group, and confirming that the second instance of the electronic device is associated with the provider may involve: providing a challenge to the second instance of the electronic device; generating an encoded version of the challenge using the authentication circuit; receiving another encoded version of the challenge from the second instance of the electronic device; and comparing the encoded version and the other encoded version to confirm that the second instance of the electronic device is associated with the provider of the electronic device. Note that the coding technique may include: a hash function, and/or an encryption technique. Moreover, the coding technique may be selected from a set of coding techniques based on a setting common to the group. Furthermore, the coding technique may involve generating a hash of the challenge and a key. In some embodiments, confirming that the second instance of the electronic device is associated with the provider involves: determining, based on the other encoded version of the challenge, an identification number associated with the second instance of the electronic device, and/or an instance of an authentication circuit in the second instance of the electronic device; accessing a list of identification numbers stored in memory in the electronic device; and verifying based on the identification number and the list that communication with the second instance of the electronic device is allowed.

Note that the confirmation may be performed: when the user invites the second user to join the device-to-device network; after a time interval has elapsed; and/or each time the electronic device communicates with the second instance of the electronic device.

In some embodiments, the control mechanism includes: a processor coupled to the interface circuit; and a memory, coupled to the processor, which stores a program module that is executed by the processor. The program module may include instructions for at least some of the operations performed by the control mechanism.

Another embodiment provides a computer-program product for use with the electronic device. This computer-program product includes instructions for at least some of the operations performed by the electronic device.

Another embodiment provides a method for communicating a message. This method includes at least some of the operations performed by the electronic device.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
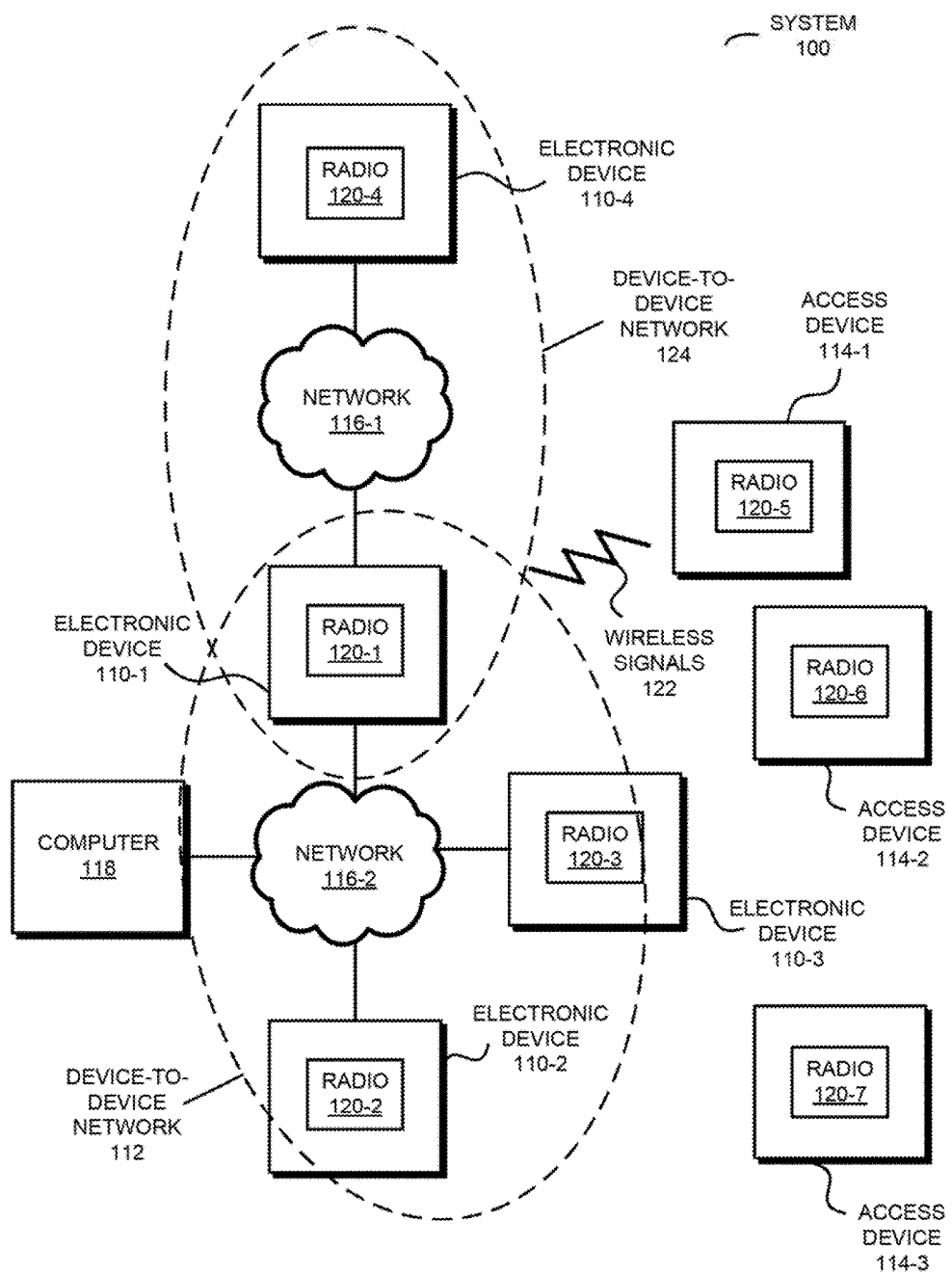
FIG. 1 is a block diagram illustrating a system with electronic devices communicating in accordance with an embodiment of the present disclosure.

In a group of described embodiments, an electronic device in a device-to-device network of a user of the electronic device communicates with a group of one or more other instances of the electronic via dynamic connections that are based on pre-established and maintained (i.e., long-lived) associations in the device-to-device network. Moreover, a given dynamic connection between the electronic device and a given instance of the electronic device in the group is setup by the electronic device without assistance of a computer in another network (such as the Internet), which conveys the communication within the group. During operation, the electronic device: confirms that a second instance of the electronic device in the group (which is associated with a second user in the device-to-device network) is associated with a provider of the electronic device; and when the association is confirmed, communicates a message to the second instance of the electronic device at a location specified by one of the associations.

By ensuring that only authorized instances of the electronic device participate in the device-to-device network, this communication technique may allow the users in the device-to-device network to exchange content with each other in a controlled manner. In particular, the users may control who has access to the information that they publish in the device-to-device network, which allows the users to avoid the problems associated with existing social networks, cloud-based storage and other online applications. Thus, the users may restrict or eliminate the ability of third parties (such as marketing firms, advertisers and, more generally, data-mining firms) to access or obtain the users' private or privileged content. Consequently, the electronic device may improve user security and privacy, which may increase the user experience when using the electronic device and exchanging content with the other users in the device-to-device network.

In the discussion that follows the instances of the electronic device may include radios and, more generally, interface circuits that communicate packets or frames in accordance with one or more communication protocols, such as: an institute of Electrical and Electronics Engineers (IEEE) 802.11 standard (which is sometimes referred to as 'Wi-Fi®,' from the Wi-Fi® Alliance of Austin, Tex.), Bluetooth® (from the Bluetooth Special Interest Group of Kirkland, Wash.), a cellular-telephone communication protocol, another type of wireless interface, a wired net work communication protocol (e.g., Ethernet, Ethernet II or an IEEE 802.3 standard, which are individually or collectively henceforth referred to as 'Ethernet') and/or another network communication protocol. For example, the cellular-telephone communication protocol may include or may be compatible with: a $2^{nd}$ generation or mobile telecommunication technology, a $4^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique. In some embodiments, the communication protocol includes Long Term Evolution or LTE. However, a wide variety of communication protocols may be used. In addition, the communication may occur via a wide variety of frequency bands. In the discussion that follows, Ethernet (which is sometimes referred to as a 'non-wireless communication technique') is used as an illustrative example.

Communication among electronic devices is shown in FIG. 1, which presents a block diagram illustrating a system that includes a group with multiple instances of an electronic device (such as electronic devices 110), access devices 114 (such as computers portable electronic devices, e.g., cellular telephones, etc.) and computer 118 that communicate with each other using wired (or non-wireless communication) via network(s) 116 (such as the Internet) and/or optional wireless communication via a cellular-telephone network, a wireless local area network and/or a another wireless communication technique. In particular, electronic devices 110 may be associated (e.g., related to, used by, owned by, etc.) with users in device-to-device network 112. Electronic devices 110 may communicate messages that include content or information with each other via network(s) 116. For example the content may include: text, audio, music, photographs, video, presentations, documents, etc. In some embodiments, the content includes embedded content, such as a pointer or a link to a location where the content can be accessed. In addition, the users may access the messages (and, thus, the content or information) on electronic devices 110 using access devices 114 via wired communication via a cable or link and/or optional wireless communication.

During the optional wireless communication, electronic devices 110 and/or access devices 114 may: transmit advertising frames on wireless channels, detect one another by scanning wireless channels, establish wireless connections (for example, by transmitting association requests), and/or transmit and receive packets or frames (which may include the association requests and/or additional information as payloads, such as messages with content or pointers to locations where the content can be accessed, etc.). Moreover, during the wired communication, electronic devices 110 may: receive packets or frames using a wired communication technique or protocol (e.g., Ethernet II or an IEEE 802.3 standard); convert the packets or frames to a WLAN communication technique or protocol (such as an IEEE 802.11 standard or an LTE standard); and transmit the packets or frames. Similarly, electronic devices 110 may: receive packets or frames using the WLAN communication technique; convert the packets or frames to the wired communication technique; and transmit the packets or frames. Thus, electronic devices 110 may perform the functions of an access point.

Figure 13:
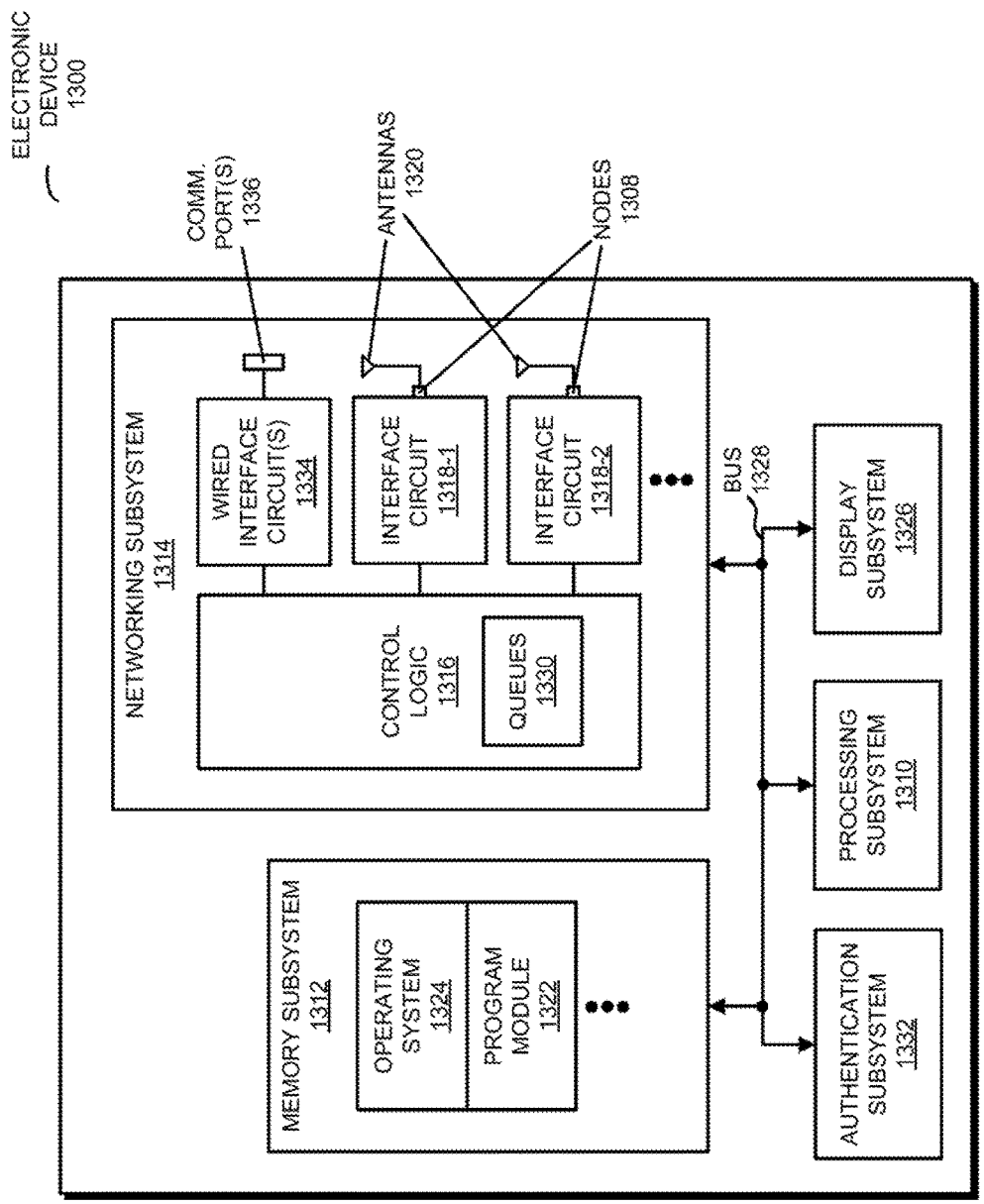
FIG. 13 is a block diagram illustrating one of the electronic devices of FIG. 1 in accordance with an embodiment of the present disclosure.

As described further below with reference to FIG. 13, electronic devices 110, access devices 114 and computer 118 may include subsystems, such as: a networking subsystem, a memory subsystem and a processor subsystem. In addition, electronic devices 110 and access devices 114 may include radios 120 in the networking subsystems. (Note that radios 120 may be instances of the same radio or may be different from each other.) More generally, electronic devices 110 and access devices 114 can include (or can be included within) any electronic devices with, the networking subsystems that enable electronic devices 110 and access devices 114 to communicate with each other using wired communication (e.g., a non-wireless or wired communication technique) and/or optional wireless communication. The optional wireless communication can comprise transmitting advertisements on wireless channels to enable electronic devices to make initial contact or detect each other, followed by exchanging subsequent data/management frames (such as association requests and responses) to establish a wireless connection, configure security options (e.g., Internet Protocol Security), and transmit and receive packets or frames via the wireless connection, etc.

As can be seen in FIG. 1, wireless signals 122 (represented by a jagged line) are optionally transmitted from radio 120-1 in electronic device 110-1. These wireless signals are optionally received by at least access device 114-1. In particular, electronic device 110-1 may optionally transmit packets. In turn, these packets may be optionally received by a radio 120-5 in access device 114-1. This may allow electronic device 110-1 to wirelessly communicate information to access device 114-1. While FIG. 1 illustrates electrons device 110-1 transmitting packets unto that electronic device 110-1 may also receive packets from access device 114-1.

In the described embodiments, processing of a packet or frame in electronic devices 110 and/or access devices 114 includes: receiving signals (such as wireless signals 122) with the packet or frame; decoding/extracting the packet or frame from the received signals to acquire the packet or frame; and processing the packet or frame to determine information contained in the packet or frame (such as the information or content associated with or included in a message).

Note that the communication among electronic devices 110, access devices 114 and/or computer 118 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a channel or link), and/or a ratio of an actual data rate to an estimated data rate (which is sometimes referred to as 'utilization').

However, as noted previously, in general the communication in network(s) 116 with cloud-based storage and/or with social-network applications implemented in the environment of network(s) 116 may not be secure, and the information stored in and/or exchanged via these applications may be accessed for purposes of marketing, advertising and/or data mining. In order to address this problem while allowing the users to exchange information with each other, electronic devices 110 may be included in secure and distributed device-to-device network 112 that is controlled by the user.

In particular, as noted previously, a given electronic device (such as electronic device 110-1) may be associated with at least a particular user. (However, note that the given electronic device may host up to N users, who may be in up to N independent device-to-device networks, where N is an integer) As described further below with reference to FIG. 4, the user may establish at account on electronic device 110-1 via one of access devices 114 (such as access device 114-1). (Note that the instances of the electronic device may be remotely accessed via a web-browser interface.) In response, electronic device 110-1 may generate an encryption key that is associated with the user. (Alternatively, electronic device 110-1 may assign a predetermined encryption key to the user.) This encryption key may function as an identifier for the user in device-to-device network 112. Note that the encryption key may be: a symmetric encryption key, an asymmetric encryption key (such as public and a private encryption keys) and/or a key that is derived from or based on the encryption key (such as a symmetric encryption key that is encrypted using the public encryption key). Then, electronic device 110-1 may generate a device-access key (or may assign a predetermined device-access key) that is specific to access device 114-1, and may provide or communicate the device-access key to access device 114-1. Subsequently, when the user attempts to access the account on electronic device 110-1 via access device 114-1, access device 114-1 may use the device-access key to authenticate with electronic device 110-1. Note that the device-access key may include an asymmetric key, such as a secure-shell public encryption key.

In some embodiments, the user may want to add another access device (such as access device 114-2). In these embodiments, electronic device 110-1 may generate and provide a token to access device 114-1. Access device 114-1 may forward the token and the location of electronic device 110-1 (such as the IP address, or equivalently a fully qualified domain name, and the communication port) to access device 114-2. Then, access device 114-2 may submit the token and a second device-access key (which electronic device 114-2 generates or access, i.e., the second device-access key may be predetermined). If electronic device 110-1 determines that the token is valid, then electronic device 110-1 may authorize the device-access key so the user can access their account on electronic device 110-1 via access device 114-2. Alternatively, when access device 114-2 submits the token to electronic device 110-1, electronic device may generate or access the second device-access key, which is then provided to access device 114-2.

After establishing their account, the user may then invite other users of other instances of electronic devices 110 to join their device-to-device network 112. As described further below with reference to FIGS. 9 and 10, the user may use access device 114-1 to provide, to electronic device 110-1, an address (such as email address) associated with a second user of a second instance of the electronic device in the group (such as electronic device 110-2). Next, electronic device 110-1 may provide a message to the address inviting the second user to join device-to-device network 112. This message may include the encryption key associated with the user (such as a public encryption key of the user) and a location of electronic device 110-1 (e.g., an IP address in network(s) 116 and a number or an identifier of a port in electronic device 110-1). In particular, electronic device 110-1 or access device 114-1 may communicate the message to electronic device 110-2, another access device associated with the second user (such as access device 114-3) or a server that manages a communication account of the second user (such as an email server) using a different communication channel than device-to-device network 112 (e.g., via out-of-band communication, such as an email or a text message). Note that the second user may verify the user using out-of-band communication. For example, the second user may contact a friend or another user in device-to-device network 112 to verify the user.

If electronic device 110-1 receives a response to the message from the second user accepting the invitation (such as a response from electronic device 110-2 or access device 114-3, which may occur when the second user clicks on or activates a link in the message with the invitation), electronic device 110-1 may verify the second user. For example, the response may include a second encryption key associated with the second user (which was generated or assigned by electronic device 110-2 when the second user set up or established their account on electronic device 110-2) and a second location of electronic device 110-2 (such as another IP address in network(s) 116 and a number or an identifier of a communication port in electronic device 110-2), and the second user may be verified based on the second encryption key (such as based on a portion of the second encryption key or based on a value derived from the second encryption key, e.g., a value generated by a applying a hash function to the second encryption key). In particular, the verification may be performed by another user in device-to-device network 312 (such as a friend) and/or by a third party (e.g., based on a credit card or, more generally, based on a financial instrument of the second user). Thus, the verification may also be performed out-of-band or using a different channel than the communication in device-to-device network 112. Once the second user is verified, electronic device 110-1 may establish a new maintained association with electronic device 110-2 in device-to-device network 112. Note that maintaining an association may include storing in memory on electronic device 110-1 the second encryption key of the second user and the second location of electronic device 110-2. In the discussion that follows, a 'maintained association' includes credentials (such as encryption keys) and locations that allow a given pair of electronic devices 110 to establish a dynamic 'connection' (such as a connection using a TCP/IP protocol), which the given, pair can use to communicate information with each other.

In this way, the user of electronic device 110-1 may send invitations to multiple users to build up device-to-device network 112. Because there may be multiple invitations pending at a given time, electronic device 110-1 may include a particular transaction identifier in a given invitation, which may be included in a given response so that the user can determine to which invitation the given response is related. Note that each of the other users in device-to-device network 112 may be a node in their own separate device-to-device network (such as device-to-device network 124), which at least partially overlap because these device-to-device networks may share one or more of the users. Thus, electronic devices 110 may allow the users to establish, their own, private device-to-device networks in a controlled manner so the users can continue to enjoy the benefits of network(s) 116 (such as the easy access and high-bandwidth communication), while allowing the user to protect their privacy and the privacy of the information they exchange with the other users via the device-to-device networks.

Figure 2:
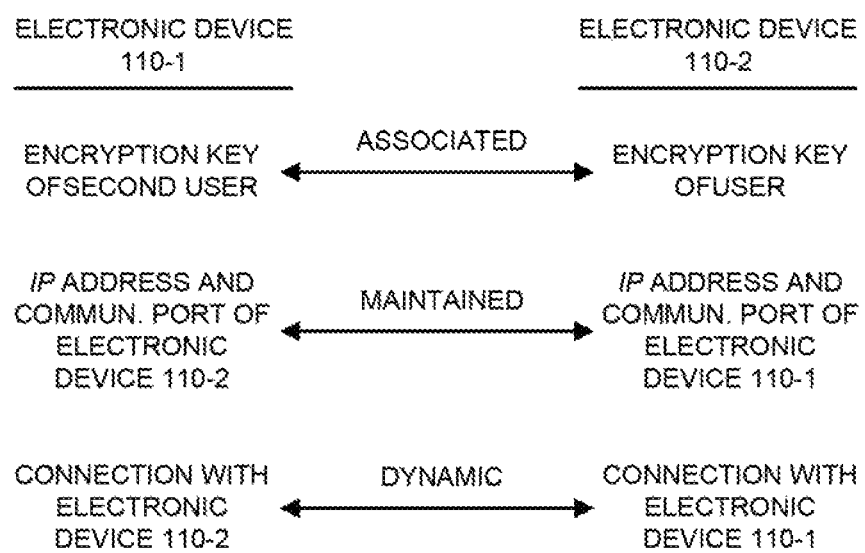
FIG. 2 is a drawing illustrating maintained associations and dynamic connections among the electronic devices in FIG. 1 in accordance with an embodiment of the present disclosure.

As described further below with reference to FIGS. 3 and 5, when the user wants to communicate or exchange content with one or more other users, the user may use electronic device 114-1 to provide the content to electronic device 110-1. In response, electronic device 110-1 may generate a message by encrypting the content or a pointer to a location where the content can be accessed using the encryption key of the user. In addition, electronic device 110-1 may optionally digitally sign the message to authenticate its validity and integrity by allowing tampering to be detected. Then, electronic device 110-1 may use the pre-established and maintained associations with one or more of the other instances of the electronic device (such as electronic device 110-2) to provide the message to electronic device 110-2. For example, the pre-established and maintained association with electronic device 110-2 may specify the location in network(s) 116 of electronic device 110-2. As shown in FIG. 2, which presents a drawing illustrating maintained associations and dynamic connections among electronic devices 110 (FIG. 1), electronic device 110-1 may use this location information, as well as credentials for electronic device 110-2 (such as the second encryption key of the second user, which is the identifier of the second user in device-to-device network 112 in FIG. 1), to establish a dynamic connection with electronic device 110-2. Note that the pre-established and maintained association with electronic device 110-2 may be maintained for longer time than the dynamic connection (i.e., the dynamic connections in device-to-device network 112 may be created and then broken on a short time scale relative to the long-lived the pre-established and maintained associations that are stored in memory in electronic devices 110). Referring back to FIG. 1, note that electronic device 110-1 may establish the dynamic connection with electronic device 110-2 without the assistance of a computer in network(s) 116, such as computer 118. (However, in other embodiments, computer 118 may help facilitate establishing the dynamic connection by providing the IP address of electronic device 110-2, but does not provide the second encryption key.)

Next, electronic device 110-1 provides the message to electronic device 110-2 via the dynamic connection and using the pre-established and maintained association between electronic device 110-1 and 110-2 (which allow the user to be authenticated by electronic device 110-2). For example, electronic device 110-1 may provide the message to the location of electronic device 110-2 via network(s) 116, and the message may include the encryption key or a value derived from or based on the encryption key as an identifier of the user. When the message is received, electronic device 110-2 may provide an alert (such as an email or a text message) to access device 114-3, so the second user is aware that they have received a message.

In some embodiments, electronic device 110-1 may communicate messages to the users in device-to-device network 112 via queues. In particular, there may be a queue associated with each of the users. Messages for the users may, therefore, be added to the appropriate queues. When a given queue in non-empty, electronic device 110-1 may attempt to communicate the messages in the queue to their recipient instances of the electronic device. (More generally, if there are pending outgoing messages in multiple queues, electronic device 110-1 may serially attempt to flush or process the messages in these queues.) If, for some reason (such as a power failure), a given message is not received by its intended recipient instance of the electronic device electronic device 110-1 does not receive an acknowledgment message), the given message may be maintained in the queue and electronic device 110-1 may continue to try to send the given message until it is received (thereby guaranteeing successful communication of the given message). After receiving confirmation that the given message was received, electronic device 110-1 may delete the given message from the queue.

In this way, electronic device 110-1 may communicate with electronic device 110-2 using point-to-point communication (e.g., directly from electronic device 110-1 to electronic device 110-2, although a message may be forwarded by routers and servers in network(s) 116 without the payload being extracted from a packet or frame associated with, the message). While the preceding example illustrated communication between, users of electronic devices 110-1 and 110-2, in other embodiments the second user may have an account on electronic device 110-1, which is associated with an independent device-to-device network from device-to-device network 112 (with the exception of the common membership of the second user in both of these device-to-device networks).

While the preceding example illustrated direct or point-to-point communication among electronic devices 110, in some embodiments there is indirect communication. For example, if a second user of electronic device 110-2 communicates a message to the user of electronic device 110-1 and a third user of electronic device 110-3 (which is in device-to-device network 124), when the user responds to the second user, their response may be forwarded by electronic device 110-2 to electronic device 110-3 (even though electronic device 110-3 is not in device-to-device network 112). This capability may allow conversations to proceed normally among the users, and may also facilitate discovery of additional users who may be invited to join device-to-device network 112.

In addition to the authentication of the users based on the encryption keys of the users when establishing the associations, the instances of the electronic device in FIG. 1 may also be authenticated, thereby adding another layer of security in the communication technique. As described further below with reference to FIGS. 6-8, each instance of the electronic device may include an authentication circuit (such as an authentication chip). This authentication circuit may authenticate that electronic device 110-2 is associated with a provider (such as a manufacturer) of the electronic device. In particular, when the user is adding the second user to device-to-device network 112, after a time interval has elapsed (such as every 30 min, hour or six hours), and/or whenever electronic device 110-1 communicates with another instance of the electronic device, electronic device 110-1 may confirm that electronic device 110-2 is from the same provider as electronic device 110-1 using the authentication circuit. For example, electronic device 110-1 may provide a challenge to electronic device 110-2. In response, electronic device 110-2 may generate an encoded version of the challenge using an instance of the authentication circuit in electronic device 110-2, and the encoded version of the challenge may be provided to electronic device 110-1. Then, electronic device 110-1 may generate another encoded version of the challenge using an instance of the authentication circuit in electronic device 110-1, and electronic device 110-1 may compare the encoded version and the other encoded version to confirm that electronic device 110-2 is associated with the provider of the electronic device.

In an exemplary embodiment, the authentication circuit uses a hash function (such as SHA-256) and an identification number that is specific to electronic device 110-2 or an instance of the authentication circuit in electronic device 110-2 (such as a serial number or an identification number) to generate an encoded version of a challenge. Electronic device 110-1 may have the identification numbers for the electronic devices in device-to-device network 112 (e.g., these identification numbers may be exchanged during the association process), and electronic device 110-1 may generate multiple other encoded versions of the challenge using the different identification numbers to confirm that one of the other encoded, versions of the challenge matches the encoded version of the challenge received from electronic device 110-2. (Note that the use of the identification number may prevent an instance of the electronic device being used to provide encoded versions of a challenge to other electronic devices that are not associated with the provider of the electronic device. For example, each of electronic devices 110 may maintain a 'white list' of allowed identification numbers or a 'black list' of non-allowed identification numbers, and the white list and/or the black list may be regularly updated by a provider of electronic devices 110.) More generally, the authentication circuit implements a coding technique (such as an encryption technique). In some embodiments, the instances of the authentication circuit include a set of coding techniques (such as 32 different hash functions) and, at any given time, a common setting that specifies one of the coding techniques is distributed to electronic devices 110, so that they all use the same coding technique in their instances of the authentication circuit.

Furthermore, electronic devices 110 may also maintain the associations by updating each other regarding any changes to the locations of electronic devices 110 (such as changes to their IP addresses and/or changes to their communication ports). As an analogy, electronic devices 110 may each function as their own personal Domain Name System, so that device-to-device network 112 is distributed and is not dependent on location information that is centrally stored in network(s) 116 (and, therefore, vulnerable to tampering, denial of service attacks, etc.). In particular, as described further below with reference to FIGS. 11 and 12, when electronic device 110-1 detects a change to a location of electronic device 110-1 in network(s) 116, electronic device 110-1 may communicate a message with an update to the location (which is encrypted using the encryption key of the user) to the other instances of fee electronic device in device-to-device network 112 and/or to the users of other instances of electronic device in device-to-device network 112 (e.g., via their access devices). A variety of techniques may be used to detect the change in the location, such as: by poking a hole through a firewall to determine the IP address of electronic device 110-1; connecting to a point in network(s) 116 and then tracing the route back to electronic device 110-1 (the first external IP address may be the IP address of electronic device 110-1); asking a server to find the IP address of electronic device 110-1; asking a router to provide the IP address of electronic device 110-1; asking a third-party service to determine the IP address of electronic device 110-1; and/or, if network(s) 116 is a public network (such as the Internet), determining the IP address of electronic device 110-1. In some embodiments, the change in the location is detected using: a Network Addressing Translation-Port Mapping protocol, a Universal Plug and Play protocol, and/or a Hairpin Network Addressing Translation protocol. Note that the updates may be provided via device-to-device network 112 and/or or a different communication channel than device-to-device network 112 (such as via email or a text message). In some embodiments, the update is communicated to the users by a third party, who is other than one of the users.

If communication of a message with the message with the update to one of electronic devices (such as electronic device 110-2) fails, electronic device 110-1 may provide may provide message with the update to the location to a trusted computer or server in network(s) 116 (such as computer 118). Then, the second user (or electronic device 110-2) may access the message with the update on the trusted computer. In this way, electronic devices 110 may obtain updates to the locations even if one or more of electronic devices 110 are temporarily unable to communicate with each other (such as when there is a power failure). Alternatively or additionally, if communication with one of electronic devices (such as electronic device 110-2) fails for a time interval (such as 1 min, 10 min, 30 min, 1 hr., etc.), electronic device 110-1 may access the trusted computer in network(s) 116 and may obtain a message with an update to a location of electronic device 110-2 (which may be encrypted using the encryption key of the second user) that was posted by electronic device 110-1 and that is stored on the trusted computer. Note that electronic device 110-1 may identify the message with the update to the location of electronic device 110-2 based on the encryption key of the second user (which may be used to look up or search for this message). In some embodiments, if communication with one of electronic devices (such as electronic device 110-2) fails for the time interval, electronic device 110-1 may poll one of more of the other instances of the electronic device in the group to determine an update to the second location. In particular, in response to update requests from electronic device 110-1, the other instances of the electronic device in the group may provide the location information of electronic device 110-2 that is stored in the pre-established and maintained associations. Then, electronic device 110-2 may use the location specified in the location information from the majority of electronic devices 110 or electronic device 110-2 may try all of the locations in the location information from the other instances of the electronic device.

In these ways, the communication technique may provide a robust, secure and decentralized device-to-device network that the users can user to communicate with each other while protecting their privacy and the privacy of the information they exchange via the device-to-device network.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames. White electronic devices 110 and access devices 114 are illustrated with a single instance of radios 120, in other embodiments electronic devices 110 and/or access devices 114 may include multiple radios.

Figure 3:
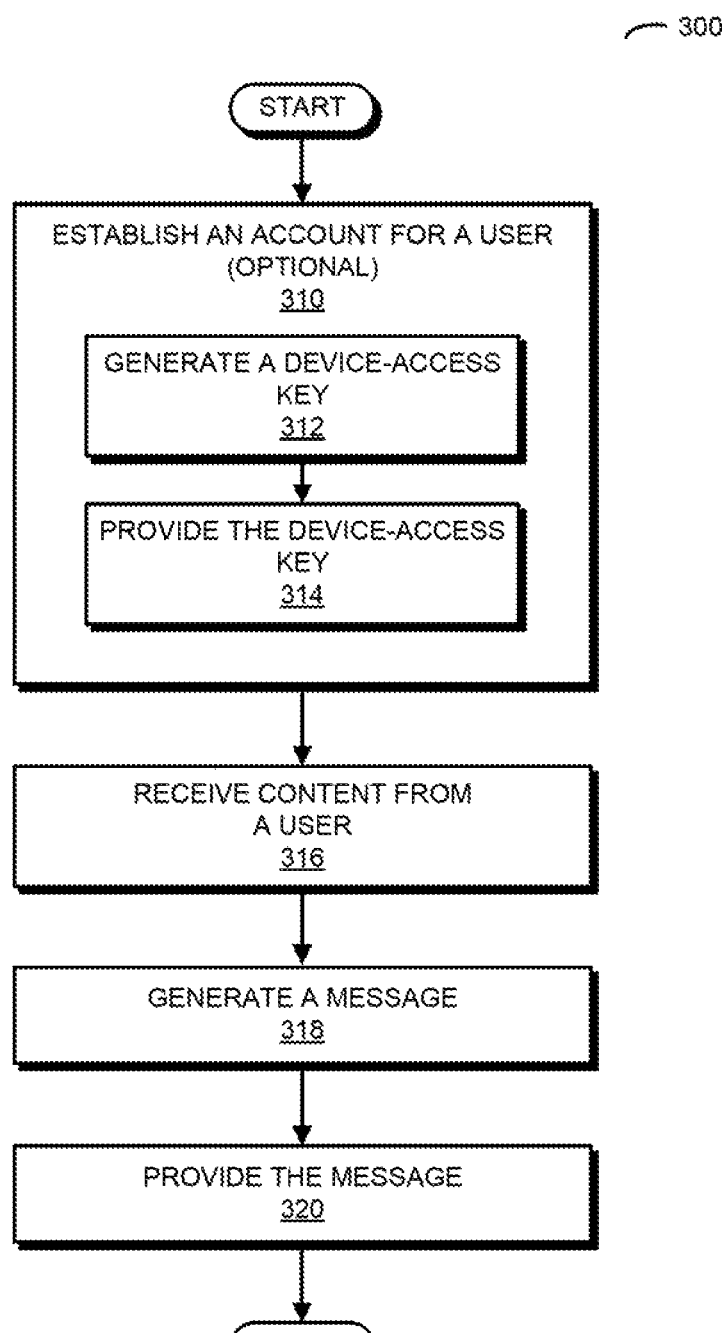
FIG. 3 is a flow diagram illustrating a method for providing a message in accordance with an embodiment of the present disclosure.

FIG. 3 presents a flow diagram illustrating a method 300 for providing a message, which may be performed by an electronic device, such as electronic device 110-1 (FIG. 1). During operation, the electronic device receives content from a user (operation 316). Then, after optionally accessing an encryption key associated with the user that is stored in memory, the electronic device generates the message (operation 318) based on the content, where generating the message involves encrypting the content based on the encryption key. Moreover, the electronic device provides, via an interface circuit in the electronic device, the message (operation 320) to at least a second instance of the electronic device in a group of one or more other instances of the electronic device in a device-to-device network of a user of the electronic device. Note that the second instance of the electronic device may be associated with a second user in the device-to-device network, and the second instance of the electronic device may be at a location specified by a pre-established and maintained association between the electronic device and the second instance of the electronic device. Furthermore, the association may be maintained for longer time than the dynamic connection. Additionally, the providing may involve at least a dynamic connection that is based on the association and that is set up by the electronic device without assistance of a computer in another network, which conveys the communication between the electronic device and the second instance of the electronic device via at least a non-wireless communication technique.

In some embodiments, prior to receiving the content (operation 316), the electronic device optionally establishes an account for the user (operation 310) on the electronic device, where establishing the account includes generating the encryption key. Moreover, the user may establish the account via an access device. Consequently, wherein establishing the account (operation 310) may optionally include: generating a device-access key (operation 312) that is specific to the access device and that is used to authenticate the access device, which allows the user to access the account on the electronic device via the access device; and providing, via the interface circuit, the device-access key (operation 312) to the access device.

Figure 4:
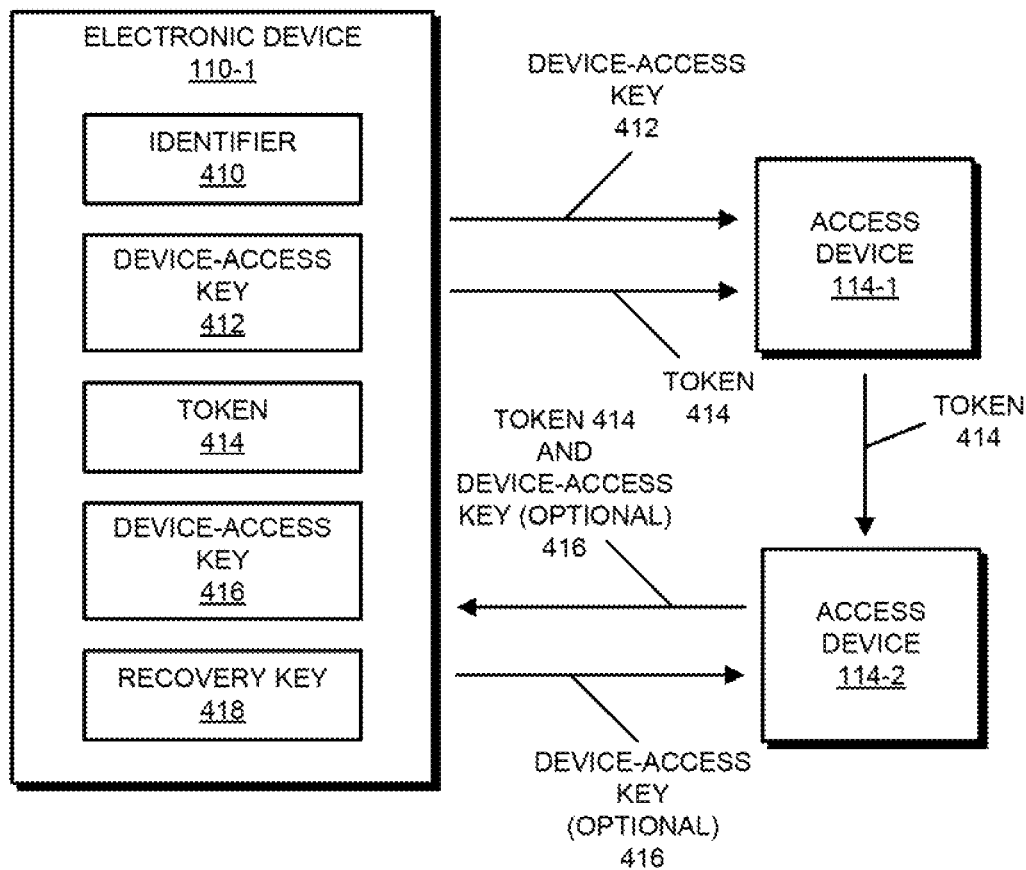
FIG. 4 is a drawing illustrating account setup on one of the electronic devices in FIG. 1 in accordance with an embodiment of the present disclosure.

These later operations are illustrated in FIG. 4, which presents a drawing illustrating account setup on the electronic device. In particular, when the user establishes their account on electronic device 110-1, electronic device 110-1 may generate an identifier 410 for the user, such as the encryption key. Moreover, electronic device 110-1 may generate or select device-access key 412 (from one or more predetermined device-access keys stored on electronic device 110-1), which is then provided to access device 114-1. This device-access key may be used to authenticate access device 114-1 during subsequent attempts to access the account using access device 114-1.

If the user wants to add additional access devices (such as access device 114-2), electronic device 110-1 may generate and provide a token 414 to access device 114-1. Then, access device 114-1 may provide token 414, as well as the location of electronic device 110-1 (such as the IP address in network(s) 116 in FIG. 1 and the communication port). Next, access device 114-2 may provide the token to electronic device 110-1 along with device-access key 416 (which may be generated or selected from one or more predetermined device-access keys stored on access device 114-2). Electronic device 110-1 may confirm that token 414 is valid and may authorize access device 114-2 to subsequently access the account via access device 114-2 using device-access key 416 for authentication. Alternatively, access device 114-2 may provide the token to electronic device 110-1, and electronic device 110-1 may generate or select device-access key 416, which is then provided to access device 114-2.

In some embodiments, electronic device 110-1 generates a recovery key 418, which is provided to access device 114-1. The user of access device 114-1 may store recovery key 418 in off-line memory (such as USB memory stick), on a trusted computer (such as computer 118 in FIG. 1), and/or on one or more other instances of the electronic device (i.e., with one or more of the other users in the device-to-device network). This recovery key may allow the user to access the account in the event that the user loses or forgets their credentials (such as an account identifier, which may be the encryption, code of the user, and the associated password).

Referring back to FIG. 3, prior to providing the message (operation 320), the electronic device optionally confirms (operation 314) that the second instance of the electronic device is associated with a provider of the electronic device. For example, as described further below with reference to FIG. 7, authentication circuits may be used to encode a challenge from the electronic device to the second instance of the electronic device.

Figure 5:
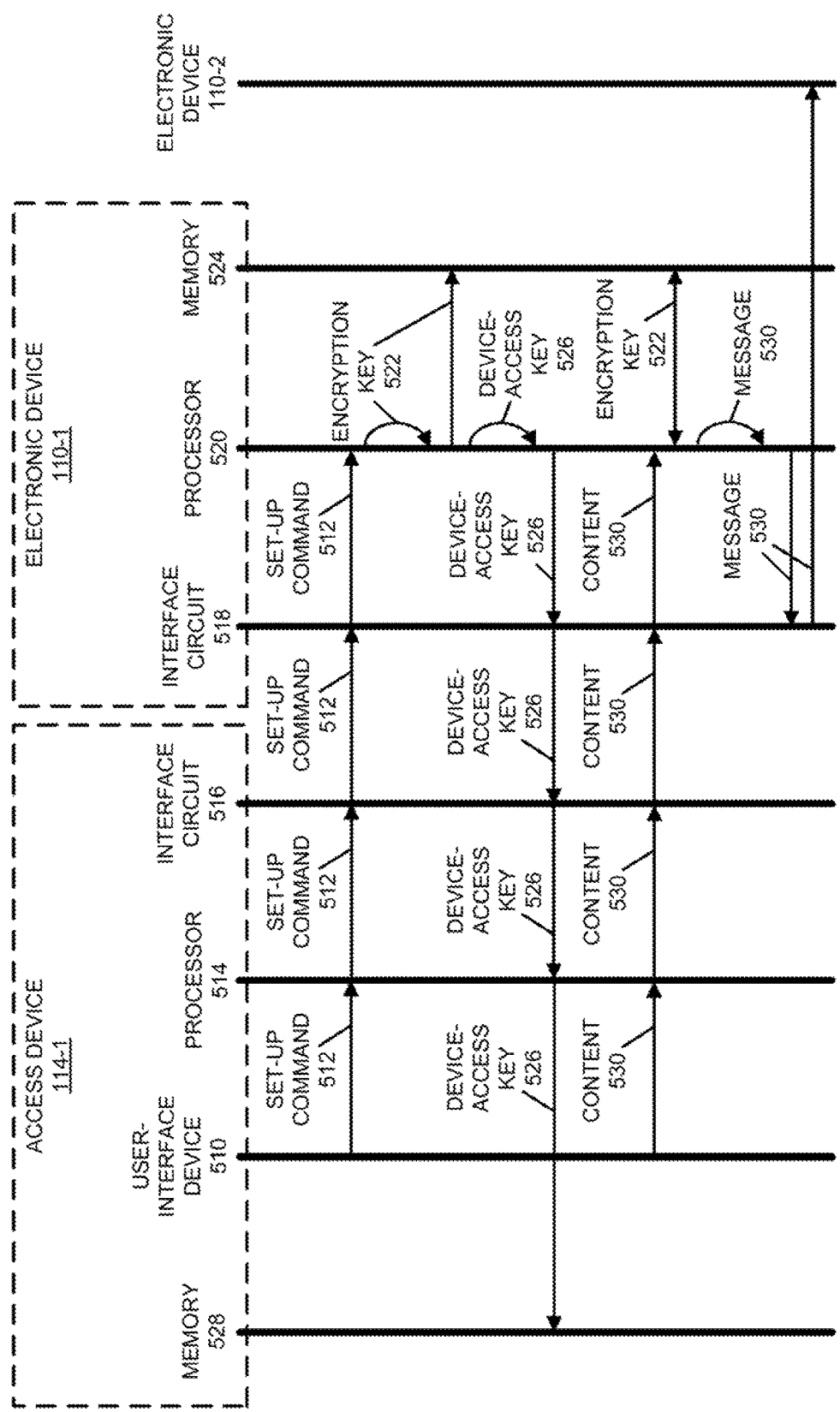
FIG. 5 is a drawing illustrating communication among the electronic devices in FIG. 1 in accordance with an embodiment of the present disclosure.

Embodiments of the communication technique are further illustrated in FIG. 5, which presents a drawing illustrating communication among electronic device 110-1, access device 114-1 and electronic device 110-2. In particular, the user may interact with a user-interface device 510 (such as a keyboard, a user interface displayed on a touch-sensitive display, etc.) to provide set-up command 512, which is communicated to processor 514 and interface circuit 516. Then, set-up command 512 is provided to electronic device 110-1.

After interface circuit 518 receives set-up command 512, processor 520 may generate encryption key 522, which is stored in memory 524. In addition, processor 520 may generate device-access key 526, which is provided to access device 114-1, via interface circuits 518 and 516. Subsequently, processor 514 may store device-access key 526 in memory 528. (As described further below with reference to FIGS. 9 and 10, the user may then invite one or more other users of electronic device 110-1 or other instances of the electronic device to join their device-to-device network.)

When the user provides content 530 via user-interface device 510, processor 514 and then interface circuit 516 provide this content to electronic device 110-1.

After interface circuit 518 receives content 530, processor 520 generates message 532 based on content 530, and using encryption key 522 that is stored in memory 528. Next, interface circuit 518 provides message 532 to at least another instance of the electronic device, such as electronic device 110-2.

Figure 6:
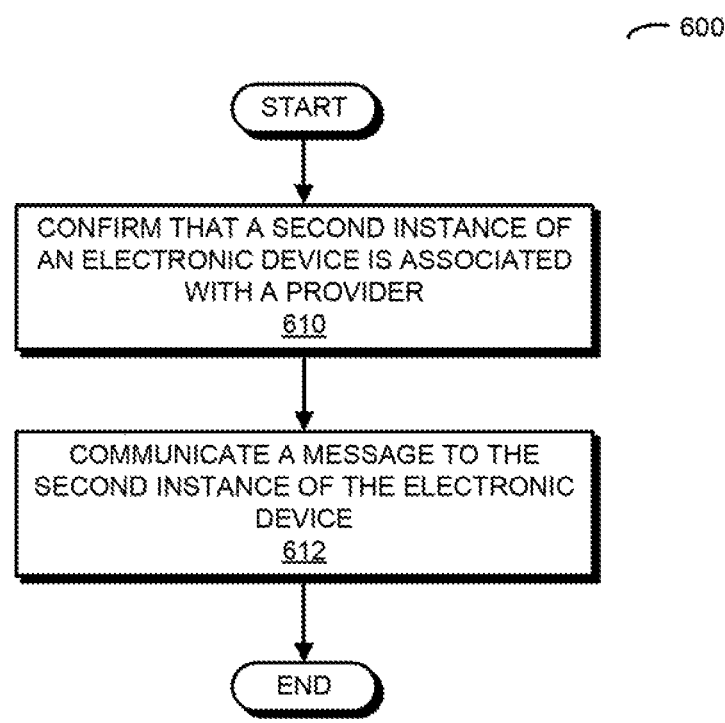
FIG. 6 is a flow diagram illustrating a method for communicating a message in accordance with an embodiment of the present disclosure.

FIG. 6 presents a flow diagram illustrating a method 600 for communicating a message, which may be performed by an electronic device, such as electronic device 110-1 (FIG. 1). During operation, the electronic device confirms that a second instance of the electronic device in a group is associated with a provider (operation 610) of the electronic device, where the second instance of the electronic device is associated with a second user in a device-to-device network, and the group includes one or more other instances of the electronic device in a device-to-device network of a user of the electronic device. Then, the electronic device communicates, when the association is confirmed (operation 610), the message to the second instance of the electronic device (operation 612) at a location specified by a pre-established and maintained association between the electronic device and the second instance of the electronic device. Note that the association may be maintained for longer time than the dynamic connection. Moreover, the communicating may involve at least a dynamic connection that is based on the association and that is set up by the electronic device without assistance of a computer in another network, which conveys the communication between the electronic device and the second instance of the electronic device via at least a non-wireless communication technique.

Figure 7:
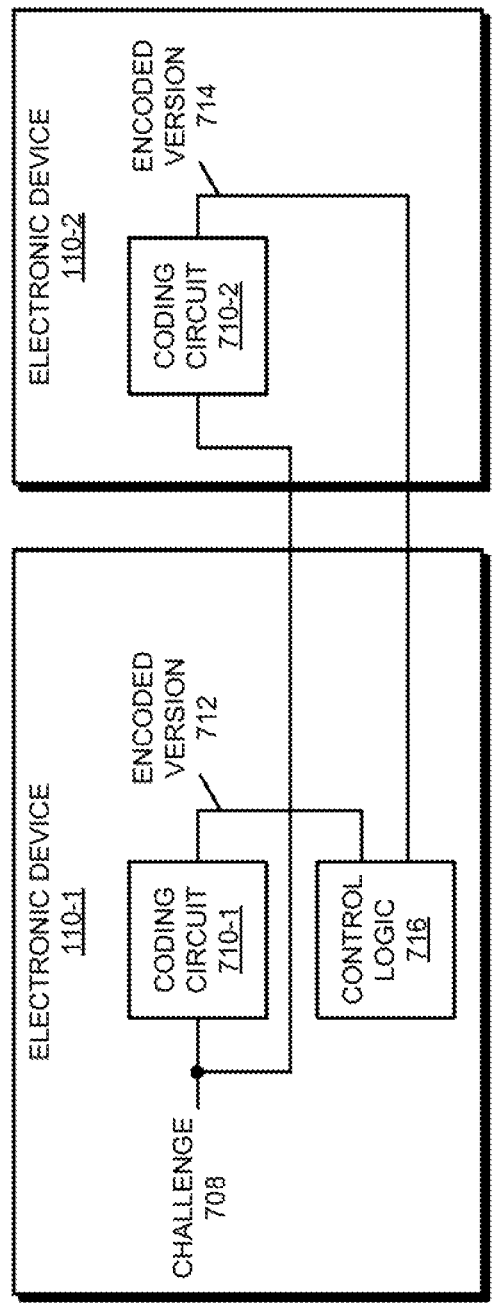
FIG. 7 is a block diagram illustrating authentication circuits in two of the electronic devices of FIG. 1 in accordance with an embodiment of the present disclosure.

FIG. 7 presents a block diagram illustrating authentication circuits 710 in two of electronic devices 110 (FIG. 1). These authentication circuits may implement a coding technique (such as a hash function, e.g., SHA-256, and/or an encryption technique) that is used to encode a challenge 708 (such as a random or a pseudorandom number) that is exchanged between electronic device 110-1 and electronic device 110-2. In particular, electronic device 110-1 may provide challenge 708 to electronic device 110-2. Then, using authentication circuit 710-1, electronic device 110-1 may generate an encoded version 712 of challenge 708. Moreover, using authentication circuit 710-2, electronic device 110-2 may generate an encoded version 714 of challenge 708, which is provided to electronic device 110-1. After receiving encoded version 714 from electronic device 110-2, electronic device 110-1 may compare encoded version 712 and encoded version 714 using control logic 716 (such as an integrated circuit or a processor executing a program module) to confirm that electronic device 110-2 is associated with a provider of electronic device 110-1 (such as a manufacturer of electronic device 110-1).

In some embodiments, encoded version 714 may be generated using the coding technique, challenge 708 and an identification number of authentication circuit 710-2 and/or electronic device 110-2. In these embodiments, electronic device 110-1 may determine, based on encoded version 714, the identification number. For example, electronic device 110-1 may generate multiple encoded versions of challenge 708 using authentication circuit 710-1 and a set of allowed identification numbers (in a 'white list') or a set of non-allowed identification numbers (in a so-called 'black list'). Then, electronic device 110-1 may verify that communication with electronic device 110-2 is allowed. For example, if encoded version 714 matches an encoded version of the challenge generated using an identification number on a white list or does not match any of the encoded versions of the challenge generated using identification numbers on a black list, the communication may be allowed.

Figure 8:
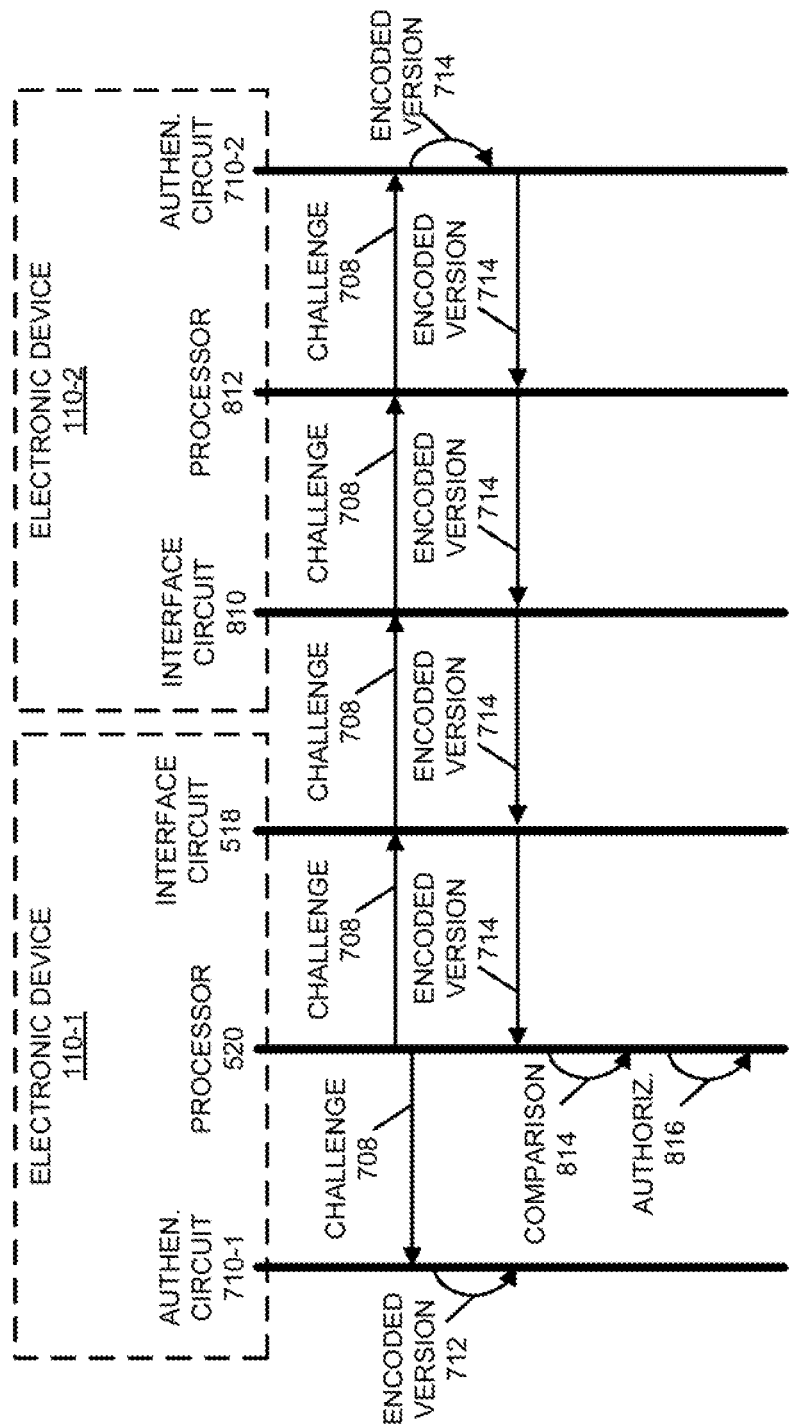
FIG. 8 is a drawing illustrating communication among the electronic devices in FIG. 1 in accordance with an embodiment of the present disclosure.

Embodiments of the communication technique are further illustrated in FIG. 8, which presents a drawing illustrating communication between electronic devices 110-1 and 110-2. In particular, processor 520 in electronic device 110-1 may instruct interface circuit 518 to provide a challenge 708 to electronic device 110-2. Then, processor 520 may instruct authentication circuit 710-1 to generate encoded version 712 of challenge 708.

After interface circuit 810 receives challenge 708, processor 812 may instruct authentication circuit 710-2 to generate encoded version 714 of challenge 708. Then, processor 812 may instruct interface circuit 810 to communicate encoded version 714 to electronic device 110-1.

Next, after interface circuit 518 receives encoded version 714 processor 520 may compare 814 encoded versions 712 and 714 to determine if electronic device 110-1 is authorized to communicate with electronic device 110-2 in the device-to-device network. If yes, electronic device 110-1 may be authorized 816 to communicate with electronic device 110-2.

Figure 9:
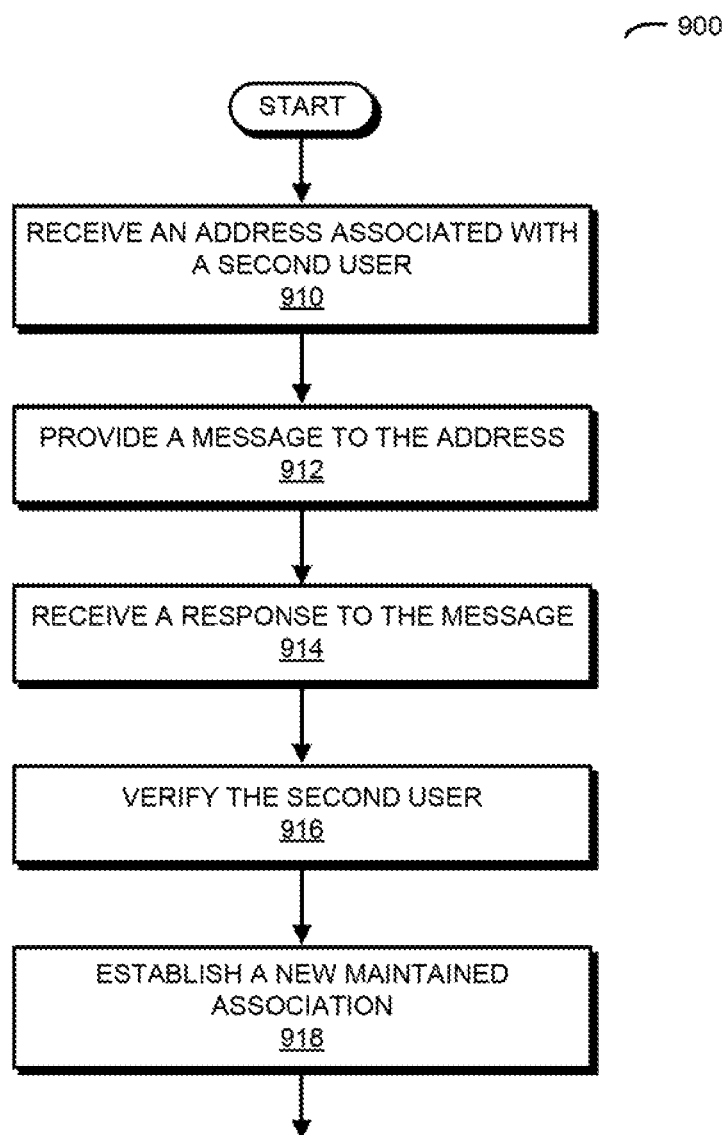
FIG. 9 is a flow diagram illustrating a method for communicating a message in accordance with an embodiment of the present disclosure.

FIG. 9 presents a flow diagram illustrating a method 900 for communicating a message, which may be performed by an electronic device, such as electronic device 110-1 (FIG. 1). During operation, the electronic device receives an address associated with a second user (operation 910) of a second instance of the electronic device in a group of one or more other instances of the electronic device in a device-to-device network of a user of the electronic device, where communication between the electronic device and the group may be via dynamic connections that are based on pre-established and maintained associations in the device-to-device network, and the associations may be maintained for longer time than the dynamic connections. Moreover, a given dynamic connection between the electronic device and a given instance of the electronic device in the group may be setup by the electronic device without assistance of a computer in another network, which conveys the communication, between the electronic device and the given instance of the electronic device via at least a non-wireless communication technique. Then, after optionally accessing an encryption key associated with the user that is stored in memory, the electronic device provides, via an interface circuit in the electronic device, a message to the address (operation 912) inviting the second user to join the device-to-device network, where the invitation message includes the encryption key and a location of the electronic device. Next, the electronic device receives, via the interface circuit, a response to the message (operation 914) from the second user accepting the invitation, where the response includes a second encryption key associated with the second user and a second location of the second instance of the electronic device. Furthermore, the electronic device verifies the second user (operation 916) based on the second encryption key. Additionally, the electronic device establishes a new maintained association (operation 918) with the second instance of the electronic device in the device-to-device network, where the new maintained association specifies a location of the second instance of the electronic device.

Note that, in some embodiments, receiving the response to the message (operation 914) and verifying the second user (operation 916) are performed by the user on an access device, and may involve communication via an out-of-band communication channel and/or a different communication technique that those associated with or used in the device-to-device network.

Figure 10:
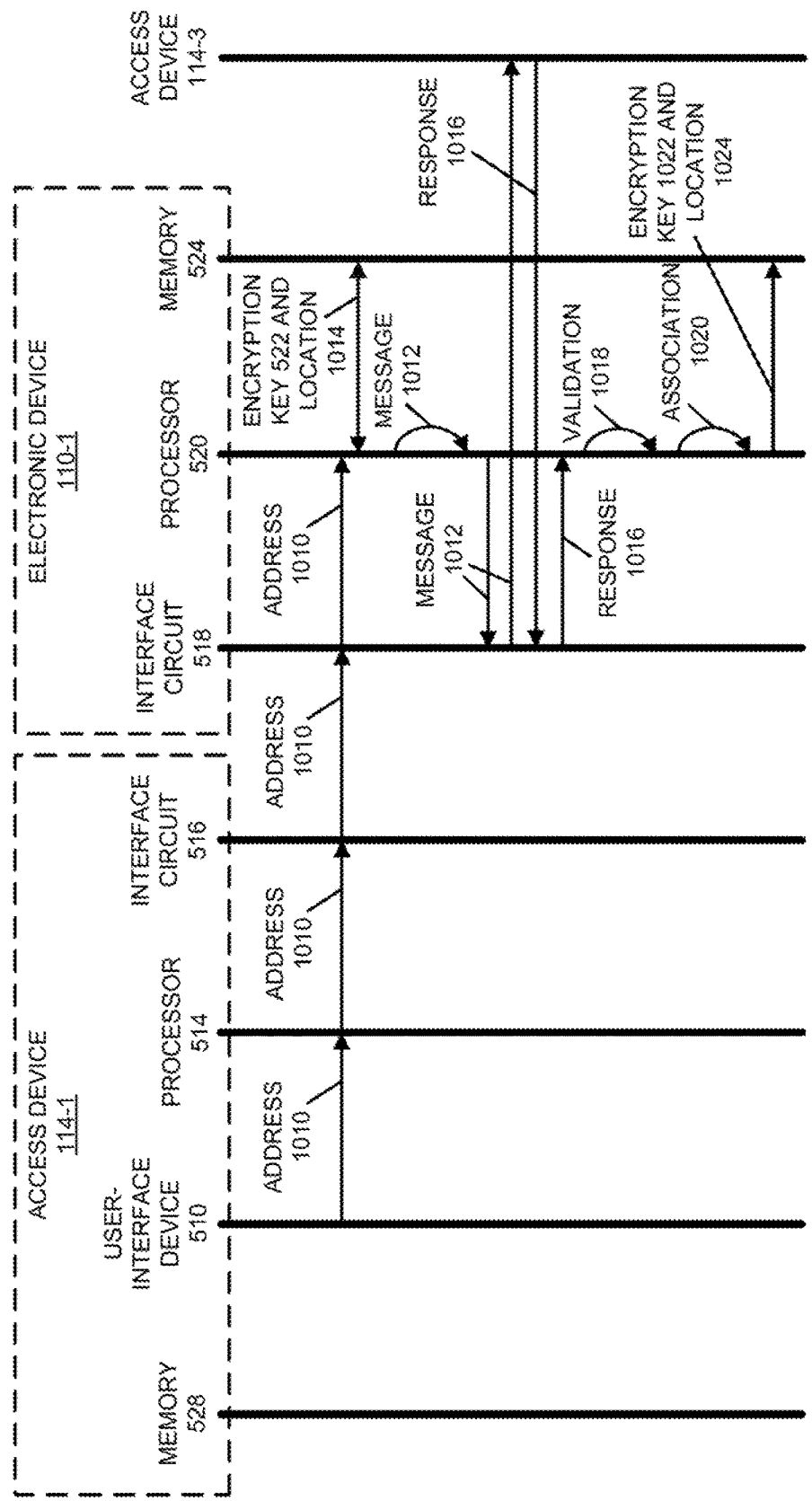
FIG. 10 is a drawing illustrating communication among the electronic devices in FIG. 1 in accordance with an embodiment of the present disclosure.

Embodiments of the communication technique are further illustrated in FIG. 10, which presents a drawing illustrating communication among electronic devices 110-1, access device 114-1 and access device 114-3. In particular, the user may interact with a user-interface device 510 (such as a keyboard, a user interface displayed on a touch-sensitive display, etc.) to provide an address 1010 associated with a second user of electronic device 110-2 (FIG. 1), which is communicated to processor 514 and interface circuit 516. Then, address 1010 is provided to electronic device 110-1.

After interface circuit 518 receives address 1010, processor 520 may generate a message 1012 with an invitation and that includes encryption key 522 and a location 1014 of electronic device 110-1, both of which are stored in memory 524. In addition, processor 520 may instruct interface circuit 518 to provide message 1012 to access device 114-3.

An interface circuit in access device 114-3 may receive message 1012, and a processor in access device 114-3 may notify the second user. When the second user opens message 1012 via a user-interface device in access device 114-3, the second user may accept the invitation. For example, the second user may click on or activate a link in message 1012. In response, the processor may instruct the interface circuit to provide response 1016 to electronic device 101-1. Note that response 1016 may include an encryption key associated with the second user and a location of electronic device 110-2, both of which are stored in memory in access device 114-3.

Interface circuit 518 may provide response 1016 to processor 520. Then, processor 520 may verify 1018 the second user based on the encryption key associated with the second user. For example, verification 1018 may be performed by: the user on access device 114-1 (and, thus, may involve communication between electronic device 110-1 and access device 114-1 or the user and access device 114-1), another user of another instance of the electronic device in the device-to-device network (and, thus, may involve communication between electronic device 110-1 and another access device associated with the other user or the user and the other access device), and/or a third party (which may involve communication between electronic device 110-1 and the third party). Thus, verification 1018 may involve communication in the device-to-device network and/or outside of the device-to-device network.

After verifying 1018 the second user, processor 520 may establish a new maintained association 1020 with electronic device 110-2 (FIG. 2). This association 1020 may include the encryption key of the second user (i.e., encryption key 1022) and the location of electronic device 110-2 (i.e., location 1024), both of which are stored in memory 524.

Figure 11:
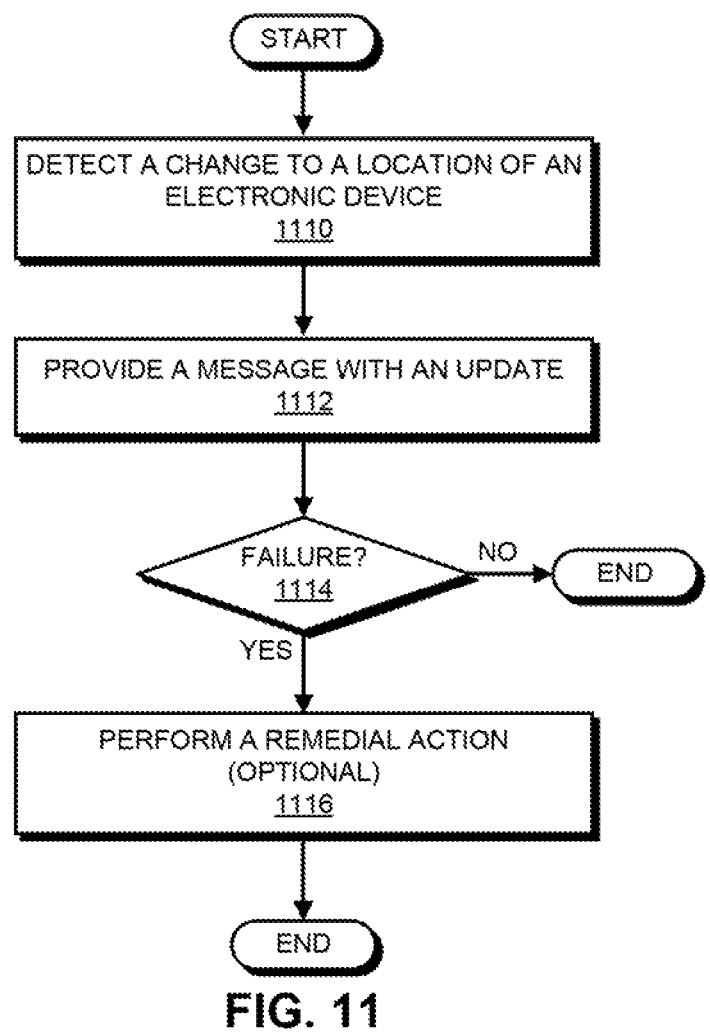
FIG. 11 is a flow diagram illustrating a method tot providing an update to a location in accordance with an embodiment of the present disclosure

FIG. 11 presents a flow diagram illustrating a method 1100 for providing an update to a location, which may be performed by an electronic device, such as electronic device 110-1 (FIG. 1). During operation, the electronic device detects, via an interface circuit in the electronic device, a change to the location of the electronic device (operation 1110) in another network, where the electronic device may communicate with a group of one or more other instances of the electronic device via dynamic connections that are based on pre-established and maintained associations in a device-to-device network of a user of the electronic device, and the associations may be maintained for longer time than the dynamic connections. Moreover, a given dynamic connection between the electronic device and a given instance of the electronic device in the group may be setup by the electronic device without assistance of a computer in the other network, which conveys the communication between the electronic device and the given instance of the electronic device via at least a non-wireless communication technique. Then, the electronic device provides, via the interface circuit, a message with the update (operation 1112) to the location to a second user in the device-to-device network who is associated with a second instance of the electronic device in the group at a second location specified by one of the associations.

In some embodiments, when communication of the message to the second instance of the electronic device fails (operation 1114), the electronic may perform an optional remedial action (operation 1116). For example, the electronic device may optionally provide, via the interface circuit, the message with the update to the location to a trusted computer in the other network, where the message is encrypted using an encryption key of the user. Alternatively or additionally, when the communication with an instance of the electronic device fails for a time interval, the electronic device may optionally access a trusted computer in the other network and obtain another message with an update to the location of the instance of the electronic device stored on the trusted computer. In some embodiments, when the communication with the instance of the electronic device fails for the time interval, the electronic device may optionally poll one of more of the other instances of the electronic device in the group to determine an update to the location of the instance of the electronic device.

Figure 12:
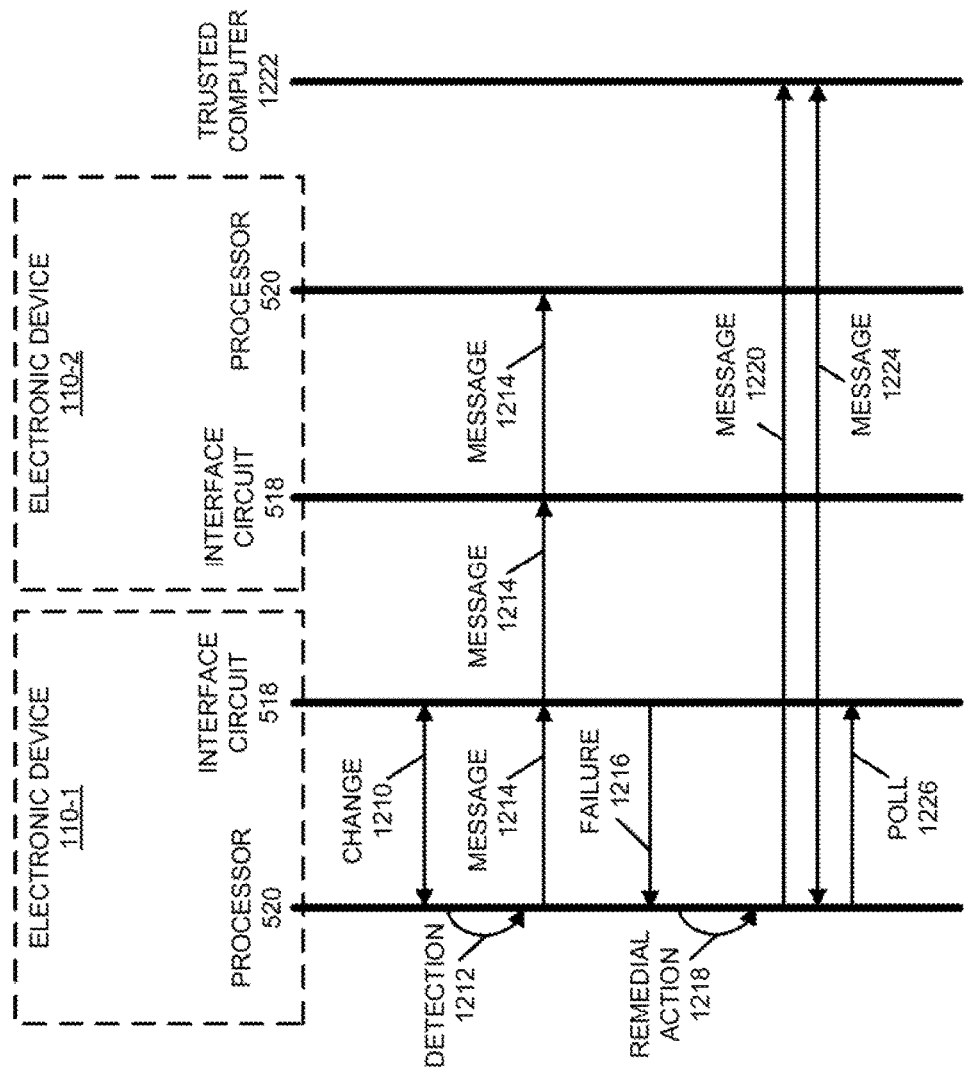
FIG. 12 is a drawing illustrating communication among the electronic devices in FIG. 1 in accordance with an embodiment of the present disclosure.

Embodiments of the communication technique are further illustrated in FIG. 12, which presents a drawing illustrating communication among electronic device 110-1, electronic device 110-2 and computes 1222. In particular, processor 520 may detect 1212, via interface circuit 518, a change 1210 to the location of electronic device 110-1 in the other network. For example, interface circuit 518 may: poke a hole through a firewall to determine an IP address of electronic device 110-1; connect to a point (such as a server) in the other network and then tracing the route back to electronic device 110-1; requesting that a server find the IP address of electronic device 110-1; requesting that a router provide the IP address of electronic device 110-1; asking a third-party service to determine the IP address of electronic device 110-1; and/or, if the other network is a public network (such as the Internet), determining the IP address of electronic device 110-1.

Then, processor 520 provides, via interface circuit 518, a message 1214 with the update to the location to a second user in the device-to-device network who is associated with electronic device 110-2. For example, message 1214 may be provided to access device 114-3 (FIG. 1) and/or to electronic device 110-2.

In some embodiments, when communication of message 1214 with electronic device 110-2 fails 1216 (such as when interface circuit 518 does not receive an acknowledgment from electronic device 110-2 within an allotted time), processor 520 may perform an optional remedial action 1218. For example, processor 520 may instruct interface circuit 518 to optionally provide message 1220 with the update to the location to a trusted computer 1222 in the other network, where the message is encrypted using an encryption key of the user. Alternatively or additionally, when the communication with electronic device 110-2 fails 1216 for a time interval (such as at a time other than when electronic device 110-1 is attempting to communicate message 1214 to electronic device 110-2), processor 520 may instruct interface circuit 518 to optionally access trusted computer 1222 and obtain a message 1224 with an update to the location of electronic device 110-2. In some embodiments, when the communication with electronic device 110-2 fails 1216 for the time interval (such as at a time other than when electronic device 110-1 is attempting to communicate message 1214 to elections device 110-2) processes 520 may instruct interface circuit 518 to optionally poll 1226 one of more of the other instances of the electronic device in the group to determine an update to the location of electronic device 110-2.

In some embodiments of the preceding methods, there may be additional or fewer operations. Moreover, the order of the operations may be changed, and/or two or more operations may be combined into a single operation.

In an exemplary embodiment, the electronic device (which is sometimes referred to as a 'homebase') allows users to share their personal information and media in a secure, decentralized social network in which multiple individuals or organizations (the nodes in the social network) interact with each other by exchanging information or content (the interconnections or links in the social network). This secure, decentralized social network allows the users to share their lives with their friends, while simultaneously protecting privileged and private information. Thus, the electronic device may allow the users full control over who they exchange information with, which allows the users to enjoy the benefits of the online world with more choice over how they share information about themselves with others.

The communication technique may be implemented using several components, including: the homebase, a social network, and provider services from a provider of the homebase. The homebase may perform the functions of a home router, and may be the source of the online identity for a particular user. In particular, the homebase may function as a jukebox, a filing cabinet at home and online, and thus may be a place where a user stores their most-important information. Consequently, the homebase may provide a central point for storage and sharing, both inside the local network and remotely.

The distributed social network gives users control over what they share. In particular, the distributed social network (which may be a specific embodiment of the device-to-device network) may allow the users to exchange information with each other (such as personal blogs that are organized and discoverable by the users in a device-to-device network) using a decentralized architecture.

The provider services include a framework of web services that can provide infrastructure for multiple interconnected homebases. For example, the provider services may include Domain Name System tracking and management. However, the provider services may not store files or file catalogs on the associated servers. Instead, these servers may provide basic user profiles for discoverability, and may allow a central and consistent source for connections between homebases.

The homebase may combine the functions of a network-attached-storage device and cloud-based storage system.

Files stored on the homebased may be locally shared and/or shared with a select group of friends (the other users in the device-to-device network). However, sharing and streaming of content may be restricted to connected or associated profiles, not to the public at large.

One of the problems with many existing peer-to-peer networks is that they are discoverable. Although many consumers have consistent network connections, most do not have permanent IP addresses. This may make it difficult for users to point other users to their electronic devices without centralized guidance or coordination. The distributed social network in the communication technique addresses this problem by tracking, maintaining and, as needed, updating IP addresses. When a homebase is first connected, it may relay its address to the social-network service associated with the user's account. Whenever, the local IP address changes, the homebase may update the provider services. In addition, the homebase may update the user's selected connections via the provider services. This may provide a foundation for a layered notification system that disseminates updates to the locations or addresses of the homebases in the distributed social network.

For example, Larry, Moe and Curly may each have homebase boxes. All three of these individuals may originally find each other by logging into a web page associated with the provider services and adding their friends. After the initial associations are made, each user's homebase may be updated with any changes to the addresses of the other users. Thus, when Larry updates his news feed, his homebase may directly send Moe and Curly's homebases his latest news. When either of them logs into their accounts on their homebases, their personalized news feed may already be downloaded with the latest updates from their connections. Note that no user content may reside on the web page or server associated with the provider services. Instead, the data may be pushed out from one homebase to another.

This layered approach may offer numerous advantages. For example, because each homebase has a local copy of the addresses of the other users in the device-to-device network, direct communication is possible. This may provide a foundation for other forms of communication, such as: voice over Internet Protocol, video conferencing and/or messaging. Note that all the communication between homebases may be encrypted.

We now describe embodiments of an electronic device. FIG. 13 presents a block diagram illustrating an electronic device 1300, such as one of electronic devices 110, one of access devices and/or computer 118 in FIG. 1. This electronic device includes processing subsystem 1310, memory subsystem 1312, networking subsystem 1314, and authentication subsystem 1332. Processing subsystem 1310 includes one or more devices configured to perform computational operations. For example, processing subsystem 1310 can include one or more microprocessors, application-specific integrated circuits (ASICs), microcontrollers, programmable-logic devices, and/or one or more digital signal processors (DSPs). One or more of these components in processing subsystem are sometimes referred to as a 'control mechanism.'

Memory subsystem 1312 includes one or more devices for storing data and/or instructions for processing subsystem 1310 and networking subsystem 1314. For example, memory subsystem 1312 can include dynamic random access memory (DRAM), static random access memory (SRAM), and/or other types of memory. In some embodiments, instructions for processing subsystem 1310 in memory subsystem 1312 include: one or more program modules or sets of instructions (such as program module 1322 or operating system 1324), which may be executed by processing subsystem 1310. Note that the one or more computer programs may constitute a computer-program mechanism. Moreover, instructions in the various modules in memory subsystem 1312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1310.

In addition, memory subsystem 1312 can include mechanisms for controlling access to the memory. In some embodiments, memory subsystem 1312 includes a memory hierarchy that comprises one or more caches coupled to a memory in electronic device 1300. In some of these embodiments, one or more of the caches is located in processing subsystem 1310.

In some embodiments, memory subsystem 1312 is coupled to one or more high-capacity mass-storage devices (not shown). For example, memory subsystem 1312 can be coupled to a magnetic or optical drive, a solid-state drive, or another type of mass-storage device. In these embodiments, memory subsystem 1312 can be used by electronic device 1300 as fast-access storage for often-used data, while the mass-storage device is used to store less frequently used data.

Networking subsystem 1314 includes one or more devices configured to couple to and communicate on a wired and/or wireless network (i.e., to perform network operations), including: control logic 1316, interface circuits 1318 and associated antennas 1320. (While FIG. 13 includes antennas 1320, in some embodiments electronic device 1300 includes one or more nodes, such as nodes 1308, e.g., pads, which can be coupled to antennas 1320. Thus, electronic device 1300 may or may not include antennas 1320.) For example, networking subsystem 1314 can include a Bluetooth networking system, a cellular networking system (e.g., a 4G/4G network such as UMTS, LTE, etc.), a universal serial bus (USB) networking system, a networking system based on the standards described in IEEE 802.11 (e.g., a Wi-Fi networking system), an Ethernet networking system, and/or another networking system. Note that the combination of a given one of interface circuits 1318 and at least one of antennas 1320 may constitute a radio. In some embodiments, networking subsystem 1314 includes a wired interface, such as an Ethernet interface.

Networking subsystem 1314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1300 may use the mechanisms in networking subsystem 1314 for performing simple wireless communication between the electronic devices, e.g., transmitting advertising or beacon frames and/or scanning for advertising frames transmitted by other electronic devices as described previously. In some embodiments, networking subsystem 1314 includes queues 1330 that are associated with users of other instances of electronic device 1300.

Authentication subsystem 1332 may include an authentication circuit that implements a coding technique (such as a current coding technique specified by a setting or flag in operating system 1324.

Within electronic device 1300, processing subsystem 1310, memory subsystem 1312, networking subsystem 1314 and authentication subsystem 1332 are coupled together using bus 1328. Bus 1328 may include an electrical, optical, and/or electro-optical connection that the subsystems can use to communicate commands and data among one another. Although only one bus 1328 is shown for clarity, different embodiments can include a different number or configuration of electrical, optical, and/or electro-optical connections among the subsystems.

In some embodiments, electronic device 1300 includes a display subsystem 1326 for displaying information on a display (such as the communication warning message), which may include a display driver, an I/O controller and the display, such as a liquid-crystal display, a multi-touch touchscreen (which is sometimes referred to as a touch-sensitive display), etc.

Electronic device 1300 can be (or can be included in) any electronic device with at least one network interface. For example, electronic device 1300 can be (or can be included in): a desktop computer, a laptop computer, a subnotebook/netbook, a server, a tablet computer, a smartphone, a cellular telephone, a consumer-electronic device (such as a television, a set-top box, audio equipment, video equipment, etc.), a portable computing device, an access point, a router, a switch, a network-attached-storage device, communication equipment, test equipment, and/or another electronic device.

Although specific components are used to describe electronic device 1300, in alternative embodiments, different components and/or subsystems may be present in electronic device 1300. For example, electronic device 1300 may include one or more additional processing subsystems, memory subsystems, networking subsystems, authentication subsystems and/or display subsystems. Moreover, while one of antennas 1320 is shown coupled to a given one of interface circuits 1318, there may be multiple antennas coupled to the given one of interface circuits 1318. Additionally, one or more of the subsystems may not be present in electronic device 1300. Furthermore, in some embodiments, electronic device 1300 may include one or more additional subsystems that are not shown in FIG. 13. Also, although separate subsystems are shown in FIG. 13, in some embodiments, some or all of a given subsystem or component can be integrated into one or more of the other subsystems or component(s) in electronic device 1300. For example, in some embodiments program module 1322 is included in operating system 1324. Note that operating system 1324 may provide services such as: a web browser, a media server, a file-sharing server, and a firewall.

Moreover, the circuits and components in electronic device 1300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1314, such as one or more radios. Moreover, the integrated circuit may include hardware and/or software mechanisms that are used for transmitting wireless signals from electronic device 1300 and receiving signals at electronic device 1300 from other electronic devices. Aside from the mechanisms herein described, radios are generally known in the art and hence are not described in detail. In general, networking subsystem 1314 and/or the integrated circuit can include any number of radios.

In some embodiments, networking subsystem 1314 and/or the integrated circuit include a configuration mechanism (such as one or more hardware and/or software mechanisms) that configures the radios to transmit and/or receive on a given channel (e.g., a given carrier frequency). For example, in some embodiments, the configuration mechanism can be used to switch the radio from monitoring and/or transmitting on a given channel to monitoring and/or transmitting on a different channel. (Note that 'monitoring' as used herein comprises receiving signals from other electronic devices and possibly performing one or more processing operations on the received signals, e.g., determining if the received signal comprises an advertising frame, calculating a performance metric, etc.) Furthermore, networking subsystem 1314 may include one or more wired interface circuits 1334 and one or more communication ports 1336 to receive and/or provide information in messages to other instances of electronic device 1300 and/or one or more of access devices 114 (FIG. 1).

While a distributed social network was used as an illustration of an application that is facilitated by the electronic device and the device-to-device network, in other embodiments the communication technique is used to implement a secure, distributed storage environment and/or another secure online application.

Moreover, while a communication protocol compatible with Ethernet was used as an illustrative example, the described embodiments may be used in a variety of network interfaces. Moreover, network(s) 116 (FIG. 1) may include one or more public and/or private networks, such as the Internet, an intranet, etc. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 1322, operating system 1324 (such as drivers for interface circuits 1318) and/or in firmware in interface circuits 1318. Alternatively or additionally, at least some of the operations in the communication technique may be implemented in a physical layer, such as hardware in interface circuits 1318.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with a group of one or more other instances of the electronic device via dynamic connections that are based at least in part on pre-established and maintained associations in a device-to-device network of a user of the electronic device, wherein the pre-established and maintained associations are maintained for longer time than the dynamic connections,
wherein a pre-established and maintained association and a given dynamic connection between the electronic device and a given instance of the electronic device in the group is set up by the electronic device without assistance of a computer in another network;
wherein the pre-established and maintained associations are in response to invitations from the user without advertising in the device-to-device network, the device-to-device network partially overlaps one or more other device-to-device networks of users of the one or more other instances of the electronic device, and a given one of the one or more other device-to-device networks is controlled by a given one of the users; and
wherein the interface circuit is configured to communicate with the given instance of the electronic device via at least a non-wireless communication technique and the other network; and
a control circuit, coupled to the interface circuit, configured to:
confirm that a second instance of the electronic device in the group is associated with a provider of the electronic device, wherein the second instance of the electronic device is associated with a second user in the device-to-device network; and
when the association is confirmed, communicate, via the interface circuit, a message for the second instance of the electronic device at a location specified by one of the pre-established and maintained associations.

2. The electronic device of claim 1, wherein the electronic device comprises an authentication circuit that implements a coding technique that is shared by the group; and
wherein confirming that the second instance of the electronic device is associated with the provider involves:
providing a challenge for the second instance of the electronic device;
generating an encoded version of the challenge using the authentication circuit;
receiving another encoded version of the challenge associated with the second instance of the electronic device; and
comparing the encoded version and the other encoded version to confirm that the second instance of the electronic device is associated with the provider of the electronic device.

3. The electronic device of claim 2, wherein the coding technique comprises one of: a hash function; and an encryption technique.

4. The electronic device of claim 2, wherein the coding technique is selected from a set of coding techniques based at least in part on a setting common to the group.

5. The electronic device of claim 2, wherein the coding technique involves generating a hash of the challenge and a key.

6. The electronic device of claim 2, wherein confirming that the second instance of the electronic device is associated with the provider involves:
determining, based at least in part on the other encoded version of the challenge, an identification number associated with one of: the second instance of the electronic device, and an instance of an authentication circuit in the second instance of the electronic device;
accessing a list of identification numbers stored in memory in the electronic device; and
verifying based at least in part on the identification number and the list that communication with the second instance of the electronic device is allowed.

7. The electronic device of claim 1, wherein the confirmation is performed one of: when the user invites the second user to join the device-to-device network; and each time the electronic device communicates with the second instance of the electronic device.

8. The electronic device of claim 1, wherein the control circuit comprises:
a processor; and
memory, coupled to the processor, which stores program instructions configured to be executed by the processor, wherein, when excited by the processor, the program instructions cause the electronic device to perform the confirmation and the communication.

9. A non-transitory computer-readable storage medium for use in conjunction with an electronic device, the computer-readable storage medium storing program instructions, wherein, when executed by the electronic device, the program instructions cause the electronic device to communicate a message, by performing operations comprising:
confirming that a second instance of the electronic device in a group is associated with a provider of the electronic device, wherein the second instance of the electronic device is associated with a second user in a device-to-device network, and wherein the group comprises one or more other instances of the electronic device in a device-to-device network of a user of the electronic device; and
communicating, when the association is confirmed, the message for the second instance of the electronic device at a location specified by a pre-established and maintained association between the electronic device and the second instance of the electronic device;
wherein the pre-established and maintained association is maintained for longer time than the dynamic connection; and
wherein the communicating involves at least a dynamic connection that is based at least in part on the pre-established and maintained association and the pre-established and maintained association and the dynamic connection are set up by the electronic device without assistance of a computer in another network;
wherein the pre-established and maintained associations are in response to invitations from the user without advertising in the device-to-device network, the device-to-device network partially overlaps one or more other device-to-device networks of users of the one or more other instances of the electronic device, and a given one of the one or more other device-to-device networks is controlled by a given one of the users; and wherein the communication between the electronic device and the second instance of the electronic device via the other network involves at least a non-wireless communication technique.

10. The computer-readable storage medium of claim 9, wherein the electronic device comprises an authentication circuit that implements a coding technique that is shared by the group; and
wherein confirming that the second instance of the electronic device is associated with the provider comprises:
providing a challenge for the second instance of the electronic device;
generating an encoded version of the challenge using the authentication circuit;
receiving another encoded version of the challenge associated with the second instance of the electronic device; and
comparing the encoded version and the other encoded version to confirm that the second instance of the electronic device is associated with the provider of the electronic device.

11. The computer-readable storage medium of claim 10, wherein the coding technique comprises one of: a hash function; and an encryption technique.

12. The computer-readable storage medium of claim 10, wherein the coding technique is selected from a set of coding techniques based at least in part on a setting common to the group.

13. The computer-readable storage medium of claim 10, wherein the coding technique involves generating a hash of the challenge and a key.

14. The computer-readable storage medium of claim 10, wherein confirming that the second instance of the electronic device is associated with the provider comprises:
determining, based at least in part on the other encoded version of the challenge, an identification number associated with one of: the second instance of the electronic device, and an instance of an authentication circuit in the second instance of the electronic device;
accessing a list of identification numbers stored in memory in the electronic device; and
verifying based at least in part on the identification number and the list that communication with the second instance of the electronic device is allowed.

15. The computer-readable storage medium of claim 9, wherein confirming that the second instance of the electronic device is associated with the provider is performed one of: when the user invites the second user to join the device-to-device network; and each time the electronic device communicates with the second instance of the electronic device.

16. A method for communicating a message, wherein the method comprises:
by an electronic device:
confirming that a second instance of the electronic device in a group is associated with a provider of the electronic device, wherein the second instance of the electronic device is associated with a second user in a device-to-device network, and wherein the group comprises one or more other instances of the electronic device in a device-to-device network of a user of the electronic device; and
communicating, when the association is confirmed, the message for the second instance of the electronic device at a location specified by a pre-established and maintained association between the electronic device and the second instance of the electronic device;
wherein the pre-established and maintained association is maintained for longer time than the dynamic connection; and
wherein the communicating involves at least a dynamic connection that is based at least in part on the association and the pre-established and maintained association and the dynamic connection are set up by the electronic device without assistance of a computer in another network;
wherein the pre-established and maintained associations are in response to invitations from the user without advertising in the device-to-device network, the device-to-device network partially overlaps one or more other device-to-device networks of users of the one or more other instances of the electronic device, and a given one of the one or more other device-to-device networks is controlled by a given one of the users; and
wherein the communication between the electronic device and the second instance of the electronic device via the other network involves at least a non-wireless communication technique.

17. The method of claim 16, wherein the electronic device comprises an authentication circuit that implements a coding technique that is shared by the group; and
wherein confirming that the second instance of the electronic device is associated with the provider involves:
providing a challenge for the second instance of the electronic device;
generating an encoded version of the challenge using the authentication circuit;
receiving another encoded version of the challenge associated with the second instance of the electronic device; and
comparing the encoded version and the other encoded version to confirm that the second instance of the electronic device is associated with the provider of the electronic device.

18. The method of claim 17, wherein the coding technique is selected from a set of coding techniques based at least in part on a setting common to the group.

19. The method of claim 17, wherein confirming that the second instance of the electronic device is associated with the provider involves:
determining, based at least in part on the other encoded version of the challenge, an identification number associated with one of: the second instance of the electronic device, and an instance of an authentication circuit in the second instance of the electronic device;
accessing a list of identification numbers stored in memory in the electronic device; and
verifying based at least in part on the identification number and the list that communication with the second instance of the electronic device is allowed.

20. The method of claim 16, wherein confirming that the second instance of the electronic device is associated with the provider is performed one of: when the user invites the second user to join the device-to-device network; and each time the electronic device communicates with the second instance of the electronic device.

* * * * *